United States Patent
Griffin et al.

(10) Patent No.: US 9,503,442 B1
(45) Date of Patent: Nov. 22, 2016

(54) CREDENTIAL-BASED APPLICATION PROGRAMMING INTERFACE KEYS

(71) Applicant: EMC Corporation, Hopkinton, MA (US)

(72) Inventors: Robert W. Griffin, Zurich (CH); Daniel V. Bailey, Pepperell, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 246 days.

(21) Appl. No.: 14/310,330

(22) Filed: Jun. 20, 2014

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |

(52) U.S. Cl.
CPC ............ H04L 63/08 (2013.01); H04L 63/0838 (2013.01)

(58) Field of Classification Search
CPC . H04L 63/08; H04L 63/0861; H04L 63/083; G06F 21/31; G06F 21/32
USPC .......................................................... 726/7
See application file for complete search history.

(56) References Cited

U.S. PATENT DOCUMENTS

| | | | | |
|---|---|---|---|---|
| 7,152,165 | B1 * | 12/2006 | Maheshwari | G06F 17/30943 707/E17.01 |
| 7,788,728 | B2 * | 8/2010 | Kim | G06F 21/10 380/259 |
| 2005/0256910 | A1 | 11/2005 | Kim et al. | |
| 2007/0150744 | A1 | 6/2007 | Cheng et al. | |
| 2007/0174614 | A1 | 7/2007 | Duane et al. | |
| 2007/0279227 | A1 | 12/2007 | Juels | |
| 2009/0254754 | A1 * | 10/2009 | Bellur | H04L 9/006 713/176 |
| 2012/0131354 | A1 | 5/2012 | French | |
| 2013/0042115 | A1 * | 2/2013 | Sweet | H04L 63/0428 713/176 |
| 2013/0054968 | A1 | 2/2013 | Gupta | |
| 2014/0012829 | A1 | 1/2014 | Bain et al. | |

OTHER PUBLICATIONS

K. Ren et al., "A Novel Privacy Preserving Authentication and Access Control Scheme for Pervasive Computing Environments," IEEE Transactions on Vehicular Technology (TVT), Jul. 2006, pp. 1373-1384, vol. 55, No. 4.

(Continued)

*Primary Examiner* — Kambiz Zand
*Assistant Examiner* — Stephen Sanders
(74) *Attorney, Agent, or Firm* — Ryan, Mason & Lewis, LLP

(57) ABSTRACT

A processing device comprises a processor coupled to a memory and is configured to obtain a credential associated with a particular access control interval, to determine an application programming interface (API) key based at least in part on the credential, and to utilize the API key in an API key enrollment protocol. The obtaining, determining and utilizing are repeated for one or more additional instances of the API key enrollment protocol corresponding to respective ones of one or more additional access control intervals. The processing device illustratively comprises a service requester device configured to carry out at least a portion of a given instance of the API key enrollment protocol with a service provider device. The API key may comprise, for example, the credential itself, or a function of the credential and other information. The credential may comprise, again by way of example, an intermediate value of a hash chain.

26 Claims, 3 Drawing Sheets

(56) References Cited

OTHER PUBLICATIONS

G. Lenzini et al., "Selective Location Blinding Using Hash Chains," 19th International Conference on Security Protocols XIX, Lecture Notes in Computer Science (LNCS), Mar. 2011, pp. 132-141, vol. 7114, Cambridge, United Kingdom.

I. Dacosta et al., "Proxychain: Developing a Robust and Efficient Authentication Infrastructure for Carrier-Scale VoIP Networks," USENIX Annual Technical Conference (USENIXATC), Jun. 2010, 14 pages.

B. Groza et al., "On the Use of One-Way Chain Based Authentication Protocols in Secure Control Systems," 2nd International Conference on Availability, Reliability and Security (ARES), The International Dependability Conference—Bridging Theory and Practice, Apr. 2007, pp. 1214-1221, Vienna, Austria.

Shopping.com Partners Resource Center Knowledge Base, "What is an API Key and How Do I Get One?" http://developer.shopping.com/kb/02n400000009R8wAAE/5014000000 . . . , May 2012, 2 pages.

API Best Practices Blog, "Do You Need API Keys? API Identity vs. Authorization," http://blog.apigee.com/detail/do_you_need_api_keys_api_identity_vs._au . . . , May 2012, 2 pages.

Wordpress.com, "API Keys," http://en.wordpress.com/api-keys/, May 2012, 2 pages.

St. Louis Fed Web Services, "API Keys," http://api.stlouisfed.org/api_key.html, May 2012, 1 page.

E. Hammer-Lahav, Ed., "The OAuth 1.0 Protocol," Internet Engineering Task Force (IETF), Request for Comments: 5849, Apr. 2010, 38 pages.

D. Hardt, Ed., "The OAuth 2.0 Authorization Framework," Internet Engineering Task Force (IETF), Request for Comments: 6749, Oct. 2012, 76 pages.

Google Accounts Authentication and Authorization, "Using OAuth 2.0 to Access Google APIs," https://developers.google.com/accounts/docs/OAuth2, May 2014, 5 pages.

U.S. Appl. No. 13/931,083, filed in the name of D.V. Bailey et al. on Jun. 28, 2013 and entitled "Protected Resource Access Control Utilizing Credentials Based on Message Authentication Codes and Hash Chain Values."

U.S. Appl. No. 13/629,771, filed in the name of D.V. Bailey et al. on Sep. 28, 2012 and entitled "Protected Resource Access Control Utilizing Intermediate Values of a Hash Chain."

\* cited by examiner

```
https://api.login.site.com/oauth/v2/
    get_request_token?oauth_nonce=ce2130523f788f313f76314ed3965ea6
    &oauth_timestamp=1202956957
    &oauth_consumer_key=12345689101112131415161718 1920
    &oauth_signature_method=plaintext
    &oauth_signature=abcdef
    &oauth_version=1.0
    &xoauth_lang_pref="en-us"
    &oauth_callback="http://yoursite.com/callback"
```

CREDENTIAL-BASED APPLICATION PROGRAMMING INTERFACE KEYS

FIELD

The field relates generally to information security, and more particularly to techniques for controlling access to protected resources.

BACKGROUND

Applications running on computers, mobile telephones and other types of processing devices are often configured to utilize application programming interface (API) keys in order to access protected resources over a network. By way of example, an API key may be submitted in conjunction with a service request directed to a server over the Internet in order to uniquely identify the source of the request. The corresponding API on the server can grant or deny access to services based on the identity of the request source as reflected by the API key. Accordingly, the API key may be viewed as supporting a type of user authentication that serves to control access to protected resources.

A more particular example of an application that utilizes API keys is a content aggregator application. Such an application is generally configured to gather information for a given user from multiple designated services including news feeds and social media sites such as Facebook and Twitter. The content aggregator application then presents all of the gathered information to the user in a unified view.

The requests generated by the application may be encoded as hypertext transfer protocol (HTTP) requests. A given such request includes an API key that identifies the user in a manner that can be understood by the corresponding service.

Unfortunately, conventional API keys can present significant problems in terms of security. For example, API keys in many cases are implemented as static passwords, and are therefore highly vulnerable to interception and replay by attackers. Such attackers could use the API key to disrupt the server or to accrue unauthorized charges on a user account. These and numerous other potential issues associated with use of static passwords can undermine the effectiveness and utility of API keys in a wide variety of applications.

SUMMARY

Illustrative embodiments of the present invention provide API keys that are determined based at least in part on credentials associated with respective access control intervals. The generation of API keys from credentials associated with respective access control intervals avoids the above-noted problems associated with use of static passwords.

In one embodiment, a processing device comprises a processor coupled to a memory and is configured to obtain a credential associated with a particular access control interval, to determine an API key based at least in part on the credential, and to utilize the API key in an API key enrollment protocol. The obtaining, determining and utilizing are repeated for one or more additional instances of the API key enrollment protocol corresponding to respective ones of one or more additional access control intervals.

The processing device in this embodiment may comprise, for example, a service requester device configured to carry out at least a portion of a given instance of the API key enrollment protocol with a service provider device.

In another embodiment, a processing device comprises a processor coupled to a memory and is configured to receive a request for an API key, to obtain a credential, to generate the API key based at least in part on the credential, and to provide the API key to at least one of a service requester and a service provider.

The processing device in this embodiment may comprise, for example, a trusted API key service device configured for communication with a service requester device and a service provider device.

Other embodiments include but are not limited to methods, apparatus, systems and articles of manufacture comprising processor-readable storage media.

The API key in one or more of the above-noted embodiments may comprise, for example, the credential itself, or a function of the credential and other information. The credential may comprise, again by way of example, an intermediate value of a hash chain. Numerous other types of credentials based on intermediate values of a hash chain or other cryptographic constructs may be used.

DETAILED DESCRIPTION

Illustrative embodiments of the present invention will be described herein with reference to exemplary information processing systems and associated computers, servers, storage devices and other types of processing devices. It is to be appreciated, however, that the invention is not restricted to use with the particular illustrative system and device configurations shown. Accordingly, the term "information processing system" as used herein is intended to be broadly construed, so as to encompass, for example, any processing system comprising at least one processing platform, including systems comprising virtual machines and other cloud infrastructure.

Certain embodiments of the invention are configured to utilize techniques disclosed in U.S. patent application Ser. No. 13/629,771, filed Sep. 28, 2012 and entitled "Protected Resource Access Control Utilizing Intermediate Values of a Hash Chain," and U.S. patent application Ser. No. 13/931,083, filed Jun. 28, 2013 and entitled "Protected Resource Access Control Utilizing Credentials based on Message Authentication Codes and Hash Chain Values," both of which are commonly assigned herewith and incorporated by reference herein. However, it is to be appreciated that use of such techniques is not a requirement of embodiments of the present invention.

Figure 1:
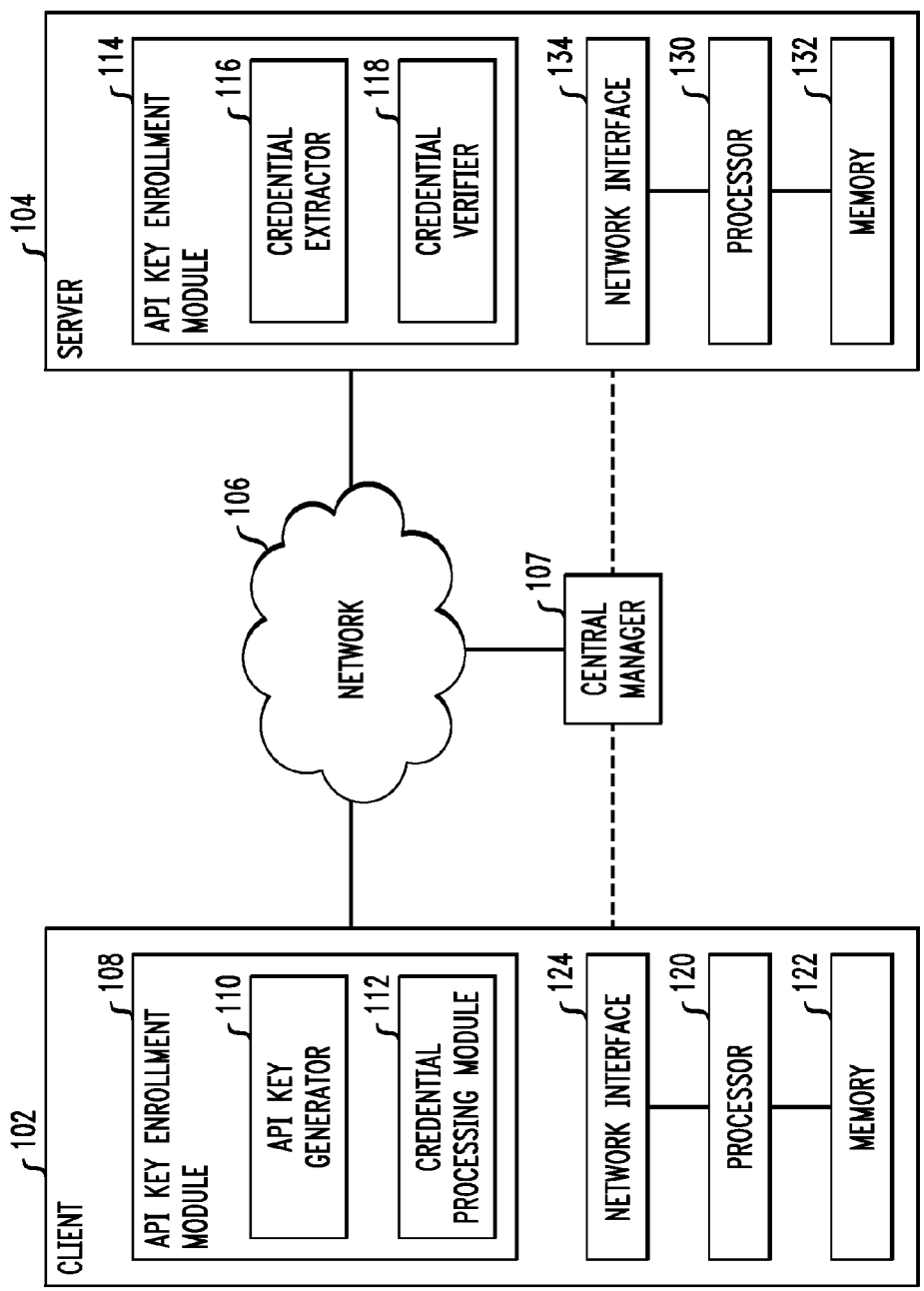
FIG. 1 shows an information processing system configured to utilize API keys based at least in part on credentials associated with respective access control intervals in an illustrative embodiment of the invention.

FIG. 1 shows an information processing system 100 configured in accordance with an illustrative embodiment of the invention. The system 100 comprises a first processing device 102 and a second processing device 104 that communicate with one another over a network 106. Also coupled to the network 106 is a central manager 107. The central manager 107 illustratively also communicates with the devices 102 and 104 via additional communication channels not necessarily implemented over the network 106, as shown by the dashed lines in the figure.

The central manager 107 in the present embodiment is assumed to incorporate credential generation functionality, such as a credential generation module, and possibly related functionality for key provisioning, user account creation and user authentication. Exemplary implementations of such functionality are disclosed in the above-referenced U.S. patent application Ser. Nos. 13/629,771 and 13/931,083.

In other embodiments, the central manager 107 can be eliminated, and the credentials can be generated in the first processing device 102. For example, the credentials in some embodiments can comprise respective one-time passcodes or other types of tokencodes generated by a hardware or software authentication token implemented in or otherwise associated with the first processing device 102.

The first and second processing devices 102 and 104 in this example are more particularly designated in the FIG. 1 embodiment as a client and a server, respectively, with the client being configured to generate an API key for use in an API key enrollment protocol carried out between the client and the server.

Although the first and second processing devices 102 and 104 are configured in the present embodiment as respective client and server devices, this is by way of example only. In other embodiments, a single device can operate as a client relative to one device and as a server relative to another device. Thus, it is possible for a single device to include both client and server functionality.

Also, numerous other arrangements of first and second processing devices are possible. For example, in another embodiment to be described below in conjunction with FIG. 5, the first and second processing devices illustratively comprise respective service requester and service provider devices.

Referring again to the FIG. 1 embodiment, the client 102 comprises an API key enrollment module 108 that includes an API key generator 110 and a credential processing module 112.

The server 104 comprises an API key enrollment module 114 that includes a credential extractor 116 and a credential verifier 118. The modules 116 and 118 may be collectively viewed as an example of what is more generally referred to herein as an "access control module" of the server 104. Other arrangements of access control modules can be used in other embodiments.

The network 106 may comprise, for example, a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

In one possible API key enrollment scenario, client 102 is implemented as a mobile telephone, a laptop computer, a tablet computer or other communication device that accesses the server 104 over the Internet. Numerous other operating scenarios involving a wide variety of different types and combinations of processing devices are possible, as will be appreciated by those skilled in the art.

As mentioned above, the credentials are illustratively generated by the central manager 107. This may involve, for example, a user associated with the client 102 authenticating to the central manager 107 and obtaining the credential corresponding to that access control interval. It is assumed in an embodiment of this type that the user has previously established a user account with the central manager 107. It is further assumed that the server 104 has been previously provisioned with information from the central manager 107 that allows credential verifier 118 to verify the credential or portions thereof when supplied to the server 104 from the client 102 in one or more API keys.

By way of example, in provisioning the server 104, a final value of a hash chain may be installed on the device in a secure manner using encryption. Such information is illustratively provisioned by the central manager 107 over a secure channel with the server 104. After provisioning, the server 104 may be completely disconnected from the central manager 107 such that future communications between the central manager 107 and the server 104 flow through the client 102 with support of one or more associated users. Accordingly, after the appropriate information has been provisioned to the server 104, there is no need for continued network connectivity between the server 104 and the central manager 107 or any associated credential generation module.

The term "user" as utilized herein is intended to be broadly construed so as to encompass, for example, a human user associated with a given device or set of devices, an automated user such as an application or other hardware or software component associated with a given device, or any other entity that may control that device.

Credentials associated with respective access control intervals may be configured in some embodiments in the form of SSC application protocol data units (APDUs) of the type described in the above-cited U.S. patent application Ser. No. 13/931,083, although a wide variety of other credential formats may be used in other embodiments. Some SSC APDUs utilize a combination of an intermediate hash value and a message authentication code or MAC, and such credentials can be utilized herein.

An exemplary credential-based API key process implemented in system 100 will now be described with reference to the flow diagram of FIG. 2. It is to be understood that this particular process is exemplary only, and additional or alternative processes can be carried out in other embodiments.

In this embodiment, the exemplary credential-based API key process includes steps 200 through 206, which are assumed to be performed by the client 102 in interacting with the server 104 and central manager 107.

In step 200, the client 102 obtains a credential associated with a particular access control interval. For example, the credential may be obtained for a current access control interval by the credential processing module 112.

As will be described in more detail below in conjunction with FIG. 4, a credential associated with a particular access control interval may be generated based at least in part on a corresponding intermediate value of a hash chain.

Although the credential is illustratively generated in the central manager 107, in other embodiments the credential may be generated in the client 102 itself or in another system entity. Also, the central manager 107 may be configured to communicate with multiple clients and multiple servers, and can therefore generate credentials for each of multiple clients to utilize in accessing one or more servers.

Moreover, in some embodiments, the central manager 107 can delegate to another system entity, such as the client 102, an ability to generate credentials for a limited time period comprising multiple access control intervals. Delegation of credential generation capability by the central manager 107 can be configured so as to allow the client 102 to generate these values without having a network connection to the central manager 107.

Credentials and other authentication information may be communicated between the client 102 and the central manager 107 using any of a number of different communication mechanisms, some of which may involve network connections established over the network 106. For example, such communications may be implemented using a web login, SMS text messages, or other techniques.

Figure 5:
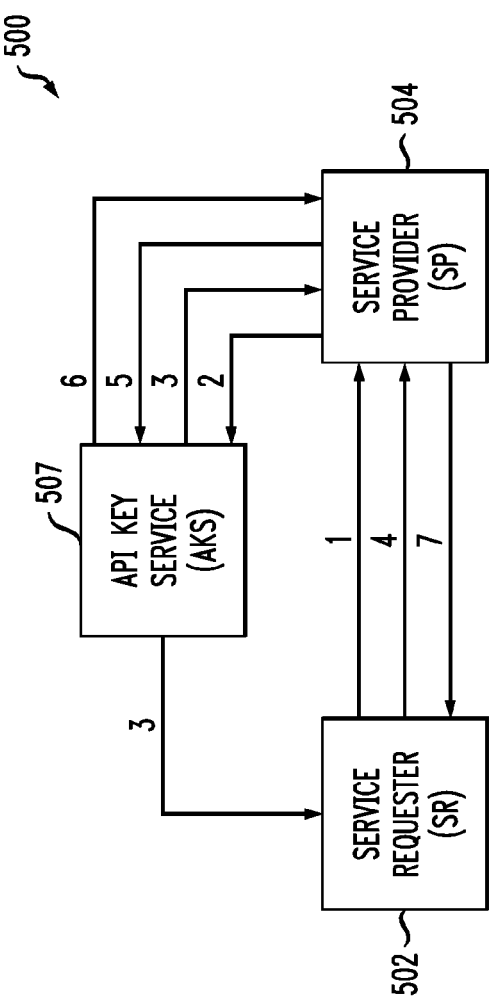
FIG. 5 shows another embodiment of an information processing system configured to utilize API keys based at least in part on credentials associated with respective access control intervals.

The central manager 107 in some embodiments, such as the embodiment to be described below in conjunction with FIG. 5, is implemented in the form of what is referred to herein as a trusted API key service.

In other embodiments, the central manager 107 can be eliminated, and the credentials can be generated in the client 102.

In generating a given credential based at least in part on a corresponding intermediate value of a hash chain, an initial value of the hash chain is determined, the initial value is hashed a designated number of times to obtain a final value of the hash chain, and intermediate values of the hash chain are associated with respective access control intervals. The intermediate value associated with the particular access control interval is then selected as at least a portion of the credential.

Accordingly, a given hash chain can be generated by applying multiple iterations of a designated one-way hash function to an initial value in order to obtain respective ones of the intermediate values and the final value, where the number of intermediate values of the hash chain in some embodiments corresponds to the desired number of access control intervals to be supported.

The hash function used to generate the hash chain may comprise any of a number of different known one-way hash functions or key derivation functions, including by way of example MD5, SHA-1, SHA-256 and BCrypt. Additional details regarding one or more of these and other conventional hash functions that may be adapted for use in embodiments of the present invention are disclosed in A. J. Menezes et al., Handbook of Applied Cryptography, CRC Press, 1997, which is incorporated by reference herein.

The final value of the hash chain is provided to the credential verifier 118 of server 104, using a separate secure connection established over the network 106, possibly by the central manager 107 via another type of channel distinct from the channel or channels used for its communications with the client 102, and is utilized by the credential verifier 118 of the server 104 to verify a given credential.

The server 104 and its credential verifier 118 are examples of what are referred to herein as "authentication entities." The credential in some embodiments incorporates an identifier or other information sufficient to allow the authentication entity to identify the corresponding final value.

It is to be appreciated, however, that the invention is not limited to use with credentials comprising intermediate hash values. For example, in other embodiments the credential comprises a one-time passcode or other type of tokencode generated by an authentication token implemented in or otherwise associated with the client 102. Such an authentication token illustratively comprises one of a hardware authentication token and a software authentication token. The latter can be implemented as an application running on the client 102.

In step 202, an API key is determined based at least in part on the credential associated with the particular access control interval. For example, in some embodiments the API key determined in step 202 comprises the credential itself, or more generally at least a portion of the credential. As one particular illustration of such an arrangement, in an embodiment in which the credential comprises an intermediate value of a hash chain, the API key could comprise that intermediate value, or a portion thereof. It is also possible to determine the API key as a function of at least a portion of the credential in combination with other information. For example, the API key may comprise an intermediate value of a hash chain and an identifier utilizable by credential verifier 118 to determine a final value of the hash chain. Numerous alternative techniques can be used to determine the API key for an access control interval based at least in part on the credential for that access control interval.

In step 204, the API key determined based on the credential associated with the particular access control interval is utilized in an API key enrollment protocol. For example, an oauth_consumer_key field of a message of the API key enrollment protocol can be configured to incorporate the API key determined based at least in part on the credential associated with the particular access control interval.

Figures 2, 3:
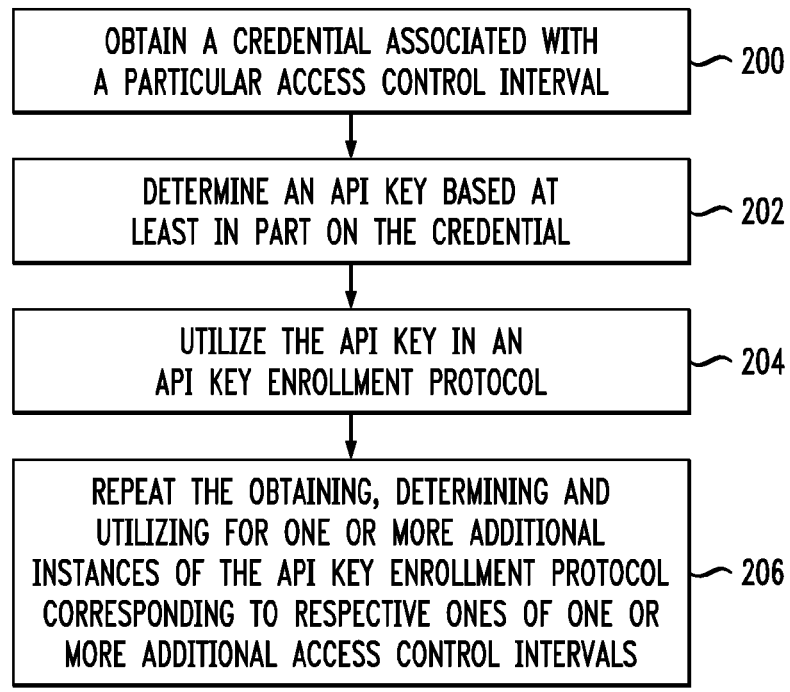
FIG. 2 is a flow diagram of an exemplary credential-based API key process implemented in the system of FIG. 1.
FIG. 3 shows an exemplary message of an API key enrollment protocol.

An exemplary message of one possible API key enrollment protocol is shown in FIG. 3. In this protocol, also known as the OAuth protocol, the message more particularly comprises a get_request_token call, in which the API key is referred to as an oauth_consumer_key. Additional details regarding the OAuth protocol can be found in IETF RFC 5849, "The OAuth 1.0 Protocol," April 2010, and IETF RFC 6749, "The OAuth 2.0 Authorization Framework," October 2012, both of which are incorporated by reference herein.

It is to be appreciated, however, that embodiments of the invention are not limited to use with the OAuth protocol. Accordingly, numerous other standardized or non-standardized API key enrollment protocols can be used. The term "key enrollment protocol" as used herein is therefore intended to be broadly construed.

In step 206, the obtaining, determining and utilizing operations of respective steps 200, 202 and 204 are repeated for one or more additional instances of the API key enrollment protocol, where the one or more additional instances correspond to respective ones of one or more additional access control intervals.

Thus, in the present embodiment, API keys will vary over access control intervals automatically based on the underlying credentials. Within a given access control interval, a given API key and the corresponding credential upon which it is based can be reused multiple times as needed to support secure access by the client 102 to services provided by the server 104. It is also possible to configure the system such that a given credential can only be used once, or a designated maximum number of times, within its corresponding access control interval.

Accordingly, after completion of the API key enrollment process in step 204 for the API key determined for a current access control interval in step 202, the enrolled API key can be utilized by the client 102 to access services provided by the server 104 or a related service provider. The server 104 receives the API key in conjunction with a particular access attempt made by the client 102 within the current access control interval, extracts the credential from the API key using credential extractor 116, and authenticates the credential to control access to a protected resource in the particular access control interval.

As a more particular example, assume that the credential associated with the particular access control interval is generated based at least in part on a corresponding intermediate value of a hash chain, and that the intermediate hash value or a function thereof is inserted into an API key as described in step 202. In this case, after the extraction of the intermediate hash value by the credential extractor 116, the credential verifier 118 identifies the particular access control interval, determines a number of hash iterations associated with the particular access control interval, applies the number of hash iterations to the intermediate value, and compares the result to the final value of the hash chain. If the result of the application of the hash iterations yields the final value of the hash chain, the credential is accepted as authentic, and otherwise the authentication fails.

Although the FIG. 2 process as illustrated in the figure assumes interaction of client 102 with a single server, separate instances of this exemplary process, possibly performed at least in part in parallel with one another, can be used to generate API keys for multiple servers in other embodiments.

The particular processing operations and other system functionality described in conjunction with the flow diagram of FIG. 2 are presented by way of illustrative example only, and should not be construed as limiting the scope of the invention in any way. Alternative embodiments can use other types of processing operations for credential-based generation of API keys as disclosed herein. For example, the ordering of the process steps may be varied in other embodiments, or certain steps may be performed concurrently with one another rather than serially. Also, the process steps may be repeated periodically in conjunction with respective distinct API key generation instances.

The client 102 and server 104 in the FIG. 1 embodiment are implemented as respective processing devices. Each such processing device generally comprises at least one processor and an associated memory, and implements one or more functional modules for controlling certain features of the system 100.

Referring again to FIG. 1, the client 102 comprises a processor 120 coupled to a memory 122 and a network interface 124.

The processor 120 may comprise a microprocessor, a microcontroller, an application-specific integrated circuit (ASIC), a field-programmable gate array (FPGA) or other type of processing circuitry, as well as portions or combinations of such circuitry elements.

The memory 122 may comprise random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

The network interface 124 allows the client 102 to communicate over the network 106 with the server 104, and may comprise one or more conventional transceivers.

One or both of API key generator 110 and credential processing module 112 of the client 102 may be implemented at least in part in the form of software that is stored in memory 122 and executed by processor 120.

Like the client 102, the server 104 comprises a processor 130 coupled to a memory 132 and a network interface 134.

The processor 130, like processor 120 in client 102, may similarly comprise a microprocessor, a microcontroller, an ASIC, an FPGA or other type of processing circuitry, as well as portions or combinations of such circuitry elements.

The memory 132, like memory 122 in client 102, may similarly comprise RAM, ROM or other types of memory, in any combination.

The network interface 134 allows the server 104 to communicate over the network 106 with the client 102 and may comprise one or more conventional transceivers.

One or both of credential extractor 116 and credential verifier 118 of the server 104 may be implemented at least in part in the form of software that is stored in memory 132 and executed by processor 130.

The above-noted network interfaces 124 and 134 may also be used to support various types of communication utilizing additional or alternative channels for communication of hash chain final values and other related information between system entities.

For example, a separate secure channel not involving communication over network 106 may be utilized by the central manager 107 to provide a final value of a hash chain to the server 104 for use by the credential verifier 118.

It is to be understood that the particular set of elements shown in FIG. 1 for providing credential-based API key generation is presented by way of illustrative example only, and in other embodiments additional or alternative elements may be used. Thus, another embodiment may include additional or alternative devices and other system entities, as well as different arrangements of device modules and other components.

As mentioned previously, various elements of system 100, such as modules 110 and 112 of client 102 and modules 116 and 118 of server 104, may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the system 100 is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products and other processing platform components may be utilized to implement at least a portion of the system 100.

As noted above, some embodiments of the invention utilize intermediate hash values as at least portions of respective credentials. In generating a hash chain providing the intermediate values, the selected hash function is applied to the initial value a designated number of times to generate each intermediate value. Each of the resulting intermediate values is assumed to be truncated to 50 bits in the present embodiment in order to limit the size of these values.

By way of example, each intermediate value of a given hash chain may be generated using SHA-256 iterated 100,000 times. A 128-bit cryptographic key may be used as the initial value. This is assumed to be a secret value that is stored as one of a plurality of initial values in the central manager 107 or other entity that generates the credentials and is not accessible to the server 104 and its credential verifier 118.

At initialization, the number of access control intervals to be supported is determined. For example, using a time window of 4 days, a given year will have 92 windows. To provide access control over a total period of 20 years, the hash chain should be configured with 1,840 intermediate values in order to support respective ones of the 1,840 windows, each corresponding to an access control interval. Of course, these particular values are merely examples, and numerous other alternative values may be used as appropriate to the needs of a given implementation.

The final value of the hash chain is obtained after 1,841 steps in each of which SHA-256 is iterated 100,000 times and the resulting output is truncated to 50 bits. The first step is applied to the initial value and the final step provides the final value, with each of the first 1,840 steps generating an intermediate value that will be used in generating a credential for a corresponding one of the 1,840 access control intervals. The final value of the hash chain may be considered a public value and is deployed on the server 104 and possibly one or more additional servers. As noted above, it is assumed that a given such server does not have access to the initial value and therefore has no ability to compute intermediate values from the initial value. Instead, it applies an appropriate number of hash iterations to a received intermediate value to determine if the result matches the final value.

Thus, in the above-described example, a given intermediate value is generated by repeatedly hashing the previous value in the chain 100,000 times and then outputting the most significant 50 bits of the 256-bit result. After outputting the most significant 50 bits of the intermediate value, the remaining bits are set to zero before starting the 100,000 hash iterations for the next value. This process is also referred to herein as "flattening" the hash chain values, and is assumed to be utilized in the present embodiment.

The following pseudocode illustrates the hash chain generation process in the above-described example:
1. Temp=Initial
2. Repeat the following 1840 times:
  a. Repeat the following 100,000 times:
    i. Temp=SHA-256(Temp)
  b. Output truncate(Temp, 50).

As long as the selected hash function is a one-way function and the initial value remains secret, obtaining the final value does not help an attacker.

The hash function for each step is iterated 100,000 times to slow down a potential brute-force attacker.

It should be noted that this exemplary hash chain generation can be performed quickly on a modern processing device. For example, a processing device based on an Intel Core i7 processor with 10 cores running at 2.4 GHz can perform about 20 million hashes per second, such that all of the 1,840 intermediate values and the final value of the hash chain described above can be generated in less than 9 seconds.

Consider an attacker that obtains an intermediate hash value for one access control interval. In order for the attacker to determine the intermediate hash value for the next access control interval, the attacker must find a value that when hashed 100,000 times yields the value held by the attacker. Even with many processing devices of the type described above, this will take far longer than the duration of the next access control interval.

The intermediate values are associated with respective access control intervals in the process of generating the credentials. As mentioned previously, the final value can be a public value and may be deployed on multiple servers without providing any ability to compute intermediate values from an initial value. Instead, the initial value is securely stored as indicated above, and the intermediate values are used in generating credentials for respective access control intervals. This involves associating the intermediate values with the access control intervals.

In the present embodiment, a first one of the intermediate values immediately following the initial value of the hash chain is associated with a final one of the access control intervals, and this reverse ordering continues through the intermediate values until a final one of the intermediate values immediately preceding the final value of the hash chain is associated with a first one of the access control intervals.

Thus, the first access control interval corresponds to the intermediate value immediately preceding the final value, such that hashing that intermediate value once yields the final value. Similarly, the second access control interval corresponds to the intermediate value that precedes the final value by two positions, such that hashing that intermediate value twice yields the final value. This inverse numbering continues with later access control intervals corresponding to respective intermediate values that are closer to the initial value and which therefore must be hashed more times to yield the final value.

Figure 4:
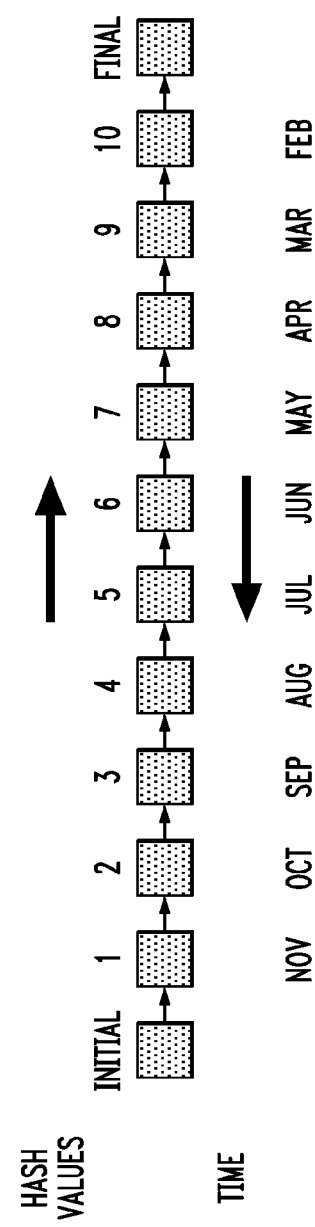
FIG. 4 is a diagram illustrating one possible technique for associating intermediate values of a hash chain with respective access control intervals in the system of FIG. 1.

A more detailed example of this type of association between hash chain intermediate values and access control intervals is illustrated in FIG. 4. This may be viewed as an example of a time-synchronous embodiment in which the hash chain intermediate values correspond to access control intervals defined by discrete periods of time. More particularly, in this example, the access control intervals are defined as respective months.

Starting from an initial value, the steps of the previously-described hash chain generation are iterated 11 times to produce a sequence of 10 intermediate values numbered 1 through 10 followed by a final value, with the hash iteration process being indicated by the right-facing arrow.

The final value itself is not used to generate a valid credential, but the intermediate value 10 that immediately precedes it is used to generate a valid credential. This last intermediate value 10 is associated with the first access control interval, which is the month of February in this example. The other intermediate values 9 through 1 are then associated with the other access control intervals, continuing in the reverse ordering indicated by the left-facing arrow. More particularly, intermediate values 9 through 1 are associated with respective access control intervals denoted in the figure as March, April, May, June, July, August, September, October and November. Thus, in the present embodiment, the intermediate values at the end of the hash chain are associated with the earliest access control intervals.

Although months are used in this example, other time intervals such as hours, days or weeks may be used to define access control intervals in other embodiments.

The final value of the hash chain is deployed on the server 104 in a manner accessible to the credential verifier 118. As mentioned above, the final value from the same hash chain can be provided to each of a plurality of servers, or different final values generated for different hash chains can be provided to respective ones of the plurality of servers. The final values in the present embodiment are considered public values and accordingly do not need to be provided over a secure channel.

An intermediate value associated with a particular interval is utilized to generate a credential that the API key generator 110 uses to generate an API key for that interval.

Upon receipt of an API key from the client 102 in conjunction with an access attempt, the credential is extracted by the credential extractor 116 and the intermediate value of the hash chain is hashed an appropriate number of times to determine if the expected final value is obtained, as part of the process for authenticating the credential in the credential verifier 118.

If the intermediate value of the hash chain is validated, the client 102 is granted access to the requested service, although grant of access may possibly be conditioned on one or more additional checks beyond validation of the intermediate hash value. Otherwise, the access attempt utilizing the API key is rejected.

As noted above, additional checks may be incorporated into the authentication process. For example, disable limit counters may be maintained that count the number of unsuccessful authentication attempts by a particular user within a given time frame. Further authentication attempts by that user after a specified disable limit has been reached may be automatically rejected.

Also, a check of the current time may be performed against a stored "high water mark." In embodiments that utilize time intervals such as such as hours, days, weeks or months to define access control intervals, the credential verifier 118 may be configured to incorporate or otherwise access a clock in order to determine how many times to hash the intermediate value before the final value is reached. When the clock reaches the start of a predetermined access control interval, the credential verifier 118 records this high water mark to disk or other nonvolatile storage. Then, during the validation of an intermediate value, the credential verifier 118 checks the current clock value against the stored high water mark. If the current clock value precedes the high water mark in time, the authentication request is rejected and additional auditing actions may be taken such as, for example, recording the suspected clock tampering incident to a log, or alerting an administrator.

The high water mark may be recorded, for example, in a Last Login field of a secure data structure of the credential verifier 118 as the latest time window for which a valid credential has been received by that module.

In an embodiment utilizing a credential of the type shown in FIG. 4, the current time window is not explicitly included in the credential. Instead, access control intervals corresponding to respective fixed time windows are utilized and it is assumed that the credential verifier 118 knows the current time window.

Alternative formats may be used that explicitly carry an indication of time in the credential. This approach has the advantage of specifying the particular time period for which the credential is valid. In the context of the example given above, as there are 8,760 hours in a year, Start Hour and Duration fields may be included in the credential and used to uniquely indicate respective starting and ending hours. Alternative time indication arrangements could be used to reduce the bit widths of these fields.

As mentioned previously, in some embodiments an API key determined based on a given intermediate hash value or other credential can be reused multiple times within the corresponding access control interval. Other embodiments of the invention can be configured to provide a one-time passcode mechanism where an API key determined based on a given intermediate hash value or other credential is used only once, and then discarded.

In one possible arrangement of this type, there is assumed to be only one verifier checking the intermediate hash value against the stored final value. The verifier in this embodiment is the credential verifier 118 of the server 104, although other system entities can serve as verifiers in other embodiments. After a given intermediate hash value is used, the corresponding credential is then marked as used by the verifier, and cannot be used again. This makes the intermediate hash value a single-use code, and allows the system to defend against a replay of a previously issued credential.

For example, the last used intermediate hash value may be associated with the previously-described "high water mark" such that this intermediate hash value and all previously used intermediate hash values are no longer valid. Even if one or more intermediate hash values have not been used, for example, if hash value 10 of FIG. 4 was never seen by the verifier, and the verifier sees hash value 8, the verifier would set the high water mark at hash value 8, and disallow any future use of hash values 8, 9, or 10. Such an arrangement advantageously prevents replay of an old credential. It also prevents other attacks in which the attacker tries to intercept an intermediate hash value and use it to generate other intermediate hash values closer to the final value.

Instead of maintaining a separate high water mark, the verifier could instead simply update the stored final value to the hash value of the last valid credential. For example, if the verifier sees hash value 8 of FIG. 4, the verifier would simply prune the hash chain making hash value 8 the new final value. As a result, there would be no way for an attacker to ever use hash value 8, or the now non-existent hash values 9 or 10. This also makes subsequent authentications more efficient, in that fewer applications of the hash function will be required to reach the new final value, while also maintaining protection against the attacks described previously.

In some embodiments, the hash chain intermediate values correspond to access control intervals defined by discrete periods of time, although it is to be appreciated that other techniques may be used to define access control intervals in other embodiments.

In generating credentials, a particular hash function, an initial value and the number of time intervals to be supported are determined. As indicated previously, various known one-way hash functions such as MD5, SHA-1 and SHA-256 may be used as the hash function. Also, a cryptographic key may be selected as the initial value. The initial value must be protected in order to protect the security of the access control process, and accordingly should be stored in a secure memory accessible only to the central manager 107 or other system entity that generates the credentials. The number of time intervals to be supported may be selected to accommodate at least the expected useful lifetime of the server 104 or its associated services. As an illustrative example, if the time intervals have a duration of one month, generating a hash chain having about 10,000 intermediate values would handle many more years than the expected lifetime of the server 104 or its associated services.

In an embodiment involving multiple hash chains having distinct initial values, where different final values are provided to different servers, the distinct initial values of the respective hash chains may be derived from a common key. For example, each of the servers may have associated identifying information, and the distinct initial values of the respective hash chains used to protect access to the respective servers may each be determined as a function of the common key and the identifying information for the corresponding server.

It is also possible to use the same base hash chain configuration to produce multiple distinct final values. For example, one could combine an identifier of the server 104 with a common initial value using addition, XOR or other similar function.

In some embodiments, efficiency advantages can be gained by replacing a linear hash chain with one based on a tree structure. For example, a given hash chain may comprise a tree having one or more interior branches each defined by application of a one-way hash function to a common key and identifying information.

It is to be appreciated that the particular credential formats described above in conjunction with FIG. 4 are presented by way of example only, and should not be construed as limiting the scope of the invention in any way. Numerous other credential formats may be used in other embodiments.

FIG. 5 shows an information processing system 500 in another embodiment of the invention. The system 500, like the system 100 described above, is also configured to utilize API keys that are determined based at least in part on credentials associated with respective access control intervals. However, in this embodiment, system 500 comprises a service requester (SR) 502, a service provider (SP) 504 and an API key service (AKS) 507.

The API key service 507 is a trusted third party relative to the service requester 502 and the service provider 504, and is illustratively implemented as a cloud-based service, although other implementations are possible. At least one processing device comprising the API key service 507 is configured for communication with respective processing devices corresponding to the service requester 502 and the service provider 504 over one or more networks that are not explicitly shown in the figure.

The service requester 502, service provider 504 and API key service 507 may be viewed in some implementations as corresponding generally to the client 102, server 104 and central manager 107, respectively, of the FIG. 1 embodiment. Each of the service requester 502, service provider 504 and API key service 507 is assumed to be implemented in a separate processing platform comprising one or more processing devices, although in other embodiments multiple ones of the FIG. 5 system elements, such as service provider 504 and API key service 507, can be implemented at least in part on the same processing platform using different portions of one or more processing devices.

In the system 500, the API key service 507 receives a request for an API key, obtains a credential, and generates the API key based at least in part on the credential. The API key service 507 provides the API key to at least one of service requester 502 and service provider 504.

For example, the service provider 504 in some embodiments requests the API key from the API key service 507 responsive to a request from the service requester 502. The service provider 504 receives the API key from the API key service 507, and utilizes the API key received from the API key service 507 to validate a presented API key received from the service requester 502 in conjunction with a service request from the service requester.

The API key service 507 illustratively associates the API key with identification information of the service requester 502, such as one or more of verification information and network address information of the service requester 502.

For example, the identification information of the service requester 502 may be received in conjunction with registration of the service requester with the API key service 507.

The network address information of the service requester 502 in some embodiments is maintained by the service provider 504 and not by the API key service 507.

At least a portion of the identification information of the service requester 502 is obtained by the service provider 504 from the service requester 502 in conjunction with registration of the service requester 502 with the service provider 504.

Additionally or alternatively, at least a portion of the identification information of the service requester 502 is provided to the API key service 507 by the service provider 504 in conjunction with the request for the API key.

In some embodiments, the API key service 507 is implemented utilizing a plurality of servers and at least a portion of the identification information of the service requester 502 is stored in a distributed manner over the plurality of servers.

The API key service 507, upon receiving from the service provider 504 a presented API key for validation in conjunction with a service request from the service requester 502, generates a cryptographically-secured assertion for the presented API key based at least in part on the identification information of the service requester 502. The assertion is utilized to validate the presented API key. For example, utilizing the assertion to validate the presented API key illustratively comprises providing the assertion to the service provider 504 in order to allow the service provider to validate the presented API key. The "cryptographically-secured assertion" referred to herein is intended to be broadly construed and accordingly can take on any of a variety of different formats.

It should be noted that the FIG. 5 embodiment does not utilize hash chain intermediate values as respective credentials. In addition, the credentials in the FIG. 5 embodiment need not be associated with respective access control intervals.

A more detailed example of the interactions between the service requester 502, service provider 504 and API key service 507 will now be described with reference to the numbered arrows shown in FIG. 5. In this example, the interactions include the following steps, with SR, SP and AKS denoting the service requester 502, service provider 504 and API key service 507, respectively, and each step corresponding to one or more of the numbered arrows shown in the figure:

1. The SR requests an API key from the SP in order to be able to submit service requests to the SP. The request for the API key includes any identity verification information required by the SP and the network address to which any responses to service requests should be sent. The identity verification information and the network address are examples of what are more generally referred to above as verification information and network address information, respectively, and still more generally as identification information of the SR. It should be noted that verification may itself be a multi-step process, as will be appreciated by those skilled in the art.

2. The SP securely requests the AKS to issue a plaintext token as the API key for the SR to use in requests. The plaintext token is an example of what is more generally referred to herein as a credential.

3. The AKS issues the API key to the SR and the SP. The AKS utilizes the identification information previously provided by the SP in order to provide the API key to the SR.

4. The SR issues a request to the SP including the plaintext token as the API key.

5. The SP presents the plaintext token to the AKS for validation.

6. The AKS prepares a cryptographically-secured assertion of the SR identity and attributes corresponding to the plaintext token and securely returns this assertion to the SP.

7. The SP compares the assertion against its registered information for the SR, checks authorization for the request from that SR and, if the SR is authorized, sends the response to the registered network address for the SR.

The above-described exemplary process provides the SP with a high degree of confidence that the response is being returned to an SR that is authorized to receive such a response. It uses the API key as a plaintext token representing the SR, but bases its trust on the AKS and the information it provides in the assertion, rather than on the API key itself.

In other implementations of the process above, the SR identification information can be segmented across two or more AKS servers to minimize risks related to security breach in one of the AKS servers. Additionally or alternatively, the SR identification information can be segmented across the SP and the AKS. In such an arrangement, for example, the registered network address could be maintained by the SP. Also, in other implementations, the SR could register directly with the AKS, rather than the AKS using SR identification information provided by the SP. Numerous other variants of the FIG. 5 embodiment are possible.

The illustrative embodiments described herein can provide a number of significant advantages relative to conventional practice. For example, these embodiments are configured to avoid the above-noted problems associated with use of static passwords. Moreover, the credential generation and processing techniques disclosed herein can be readily deployed at low cost using existing API key protocols and infrastructure. Highly secure API keys can therefore be provided without changing current key formats or their manner of use in service requests.

Accordingly, embodiments of the invention can be implemented in a wide variety of API key contexts including many different otherwise conventional systems that implement access control using API keys.

Moreover, embodiments of the invention can be configured to carry other types of information in an API key field of a given message.

For example, an API key field could be used as a response portion of a challenge-response protocol. In one possible arrangement of this type, after each successful authentication of a given client, a server passes a random or otherwise unique value x back to the client as a challenge. The next time the client authenticates to the server, the client computes $f(x)$ using a designated cryptographic function $f$. The result is sent back to the server as a response to the challenge, using the API key field.

As another example, the API key field can be used to carry a public-key signature along with a fixed client identifier. In one possible arrangement of this type, the signature is over the client identifier, server identifier and a unique value such as time of day. A tokenization server receives the client identifier, determines the unique value, and checks the signature. The tokenization server validates the signature and outputs an API key which is input to a resource server.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing platforms, networks and processing device configurations. Also, different arrangements of API keys, credential formats and access control processes may be used. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
  obtaining a credential associated with a particular access control interval;
  determining an application programming interface (API) key based at least in part on the credential, wherein the API key is used to control access to a protected resource over a network;
  utilizing the API key in an API key enrollment protocol; and
  repeating the obtaining, determining and utilizing for one or more additional instances of the API key enrollment protocol corresponding to respective ones of one or more additional access control intervals;
  wherein the obtaining, determining, utilizing and repeating are performed by at least one processing device comprising a processor coupled to a memory.

2. The method of claim 1 wherein the API key comprises one of at least a portion of the credential itself and a function of at least a portion of the credential and other information.

3. The method of claim 1 wherein the credential comprises an intermediate value of a hash chain, and wherein obtaining the credential comprises:
  determining an initial value of the hash chain;
  hashing the initial value a designated number of times to obtain a final value of the hash chain;
  associating intermediate values of the hash chain with respective ones of the access control intervals;
  selecting as at least a portion of the credential the intermediate value associated with the particular access control interval; and
  providing the final value of the hash chain to an authentication entity.

4. The method of claim 3 wherein the credential further comprises information sufficient to allow the authentication entity to identify the final value.

5. The method of claim 1 wherein utilizing the API key in an API key enrollment protocol comprises configuring an oauth_consumer_key field of a message of the API key enrollment protocol to incorporate the API key determined based at least in part on the credential associated with the particular access control interval.

6. The method of claim 1 wherein the API key comprises an intermediate value of a hash chain and an identifier utilizable to determine a final value of the hash chain.

7. The method of claim 1 wherein the credential comprises a one-time passcode generated by an authentication token.

8. The method of claim 1 wherein obtaining a credential comprises obtaining the credential from an API key service.

9. The method of claim 1 wherein the obtaining, determining, utilizing and repeating are performed by said at least one processing device executing program code of one or more software programs stored on a non-transitory processor-readable storage medium.

10. An apparatus comprising:
at least one processing device comprising a processor coupled to a memory;
wherein said at least one processing device is configured:
to obtain a credential associated with a particular access control interval;
to determine an application programming interface (API) key based at least in part on the credential, wherein the API key is used to control access to a protected resource over a network:
to utilize the API key in an API key enrollment protocol; and
to repeat the obtaining, determining and utilizing for one or more additional instances of the API key enrollment protocol corresponding to respective ones of one or more additional access control intervals.

11. A method comprising:
receiving an application programming interface (API) key, wherein the API key is used to control access to a protected resource over a network;
determining from the API key a credential associated with a particular access control interval; and
authenticating the credential to control access to the protected resource in the particular access control interval;
wherein the receiving, determining and authenticating are performed by at least one processing device comprising a processor coupled to a memory.

12. The method of claim 11 wherein the credential comprises an intermediate value of a hash chain, and wherein authenticating the credential comprises:
identifying the particular access control interval;
determining a number of hash iterations associated with the particular access control interval;
applying the number of hash iterations to the intermediate value; and
if the applying yields a final value of the hash chain, accepting the credential as authentic.

13. The method of claim 11 wherein the receiving, determining and authenticating are performed by said at least one processing device executing program code of one or more software programs stored on a non-transitory processor-readable storage medium.

14. An apparatus comprising:
at least one processing device comprising a processor coupled to a memory;
wherein said at least one processing device is configured:
to receive an application programming interface (API) key, wherein the API key is used to control access to a protected resource over a network;
to determine from the API key a credential associated with a particular access control interval; and
to authenticate the credential to control access to the protected resource in the particular access control interval.

15. A method comprising:
receiving a request for an application programming interface (API) key;
obtaining a credential;
generating the API key based at least in part on the credential, wherein the API key is used to control access to a protected resource a network; and
providing the API key to at least one of a service requester and a service provider;
wherein the receiving, obtaining, generating and providing are performed by at least one processing device comprising a processor coupled to a memory.

16. The method of claim 15 wherein said at least one processing device is associated with an API key service.

17. The method of claim 16 wherein at least one of:
the request for the API key is received by the API key service from the service provider;
the API key is provided by the API key service to both the service requester and the service provider;
the API key is associated by the API key service with identification information of the service requester;
the identification information of the service requester comprises at least one of verification information and network address information of the service requester;
the network address information is maintained by the service provider and not by the API key service;
at least a portion of the identification information of the service requester is obtained by the service provider from the service requester in conjunction with registration of the service requester with the service provider; and
at least a portion of the identification information of the service requester is provided to the API key service by the service provider in conjunction with the request for the API key.

18. The method of claim 15 further comprising:
receiving a presented API key for validation in conjunction with a service request from the service requester;
generating a cryptographically-secured assertion for the presented API key based at least in part on identification information of the service requester; and
utilizing the assertion to validate the presented API key.

19. The method of claim 18 wherein utilizing the assertion to validate the presented API key comprises providing the assertion to the service provider in order to allow the service provider to validate the presented API key.

20. The method of claim 16 further comprising receiving identification information of the service requester in conjunction with registration of the service requester with the API key service.

21. The method of claim 17 wherein the API key service is implemented utilizing a plurality of servers and further wherein at least a portion of said identification information of the service requester is stored in a distributed manner over the plurality of servers.

22. The method of claim 15 wherein the receiving, obtaining, generating and providing are performed by said at least one processing device executing program code of one or more software programs stored on a non-transitory processor-readable storage medium.

23. A method comprising:
requesting an application programming interface (API) key from an API key service responsive to a request from a service requester, wherein the API key is used to control access to a protected resource over a network;
receiving the API key from the API key service; and
utilizing the API key received from the API key service to validate a presented API key received from the service requester in conjunction with a service request from the service requester;
wherein the requesting, receiving and utilizing are performed by at least one processing device comprising a processor coupled to a memory.

24. The method of claim 23 wherein the requesting, receiving and utilizing are performed by said at least one processing device executing program code of one or more software programs stored on a non-transitory processor-readable storage medium.

25. The apparatus of claim 10 wherein the API key comprises an intermediate value of a hash chain and an identifier utilizable to determine a final value of the hash chain.

26. The apparatus of claim 14 wherein the API key comprises an intermediate value of a hash chain and an identifier utilizable to determine a final value of the hash chain.

\* \* \* \* \*